(12) United States Patent
Schutte et al.

(10) Patent No.: US 12,418,173 B2
(45) Date of Patent: Sep. 16, 2025

(54) ELECTRICAL SURGE SUPPRESSOR

(71) Applicant: STRIKE TECH (PROPRIETARY) LIMITED, Centurion (ZA)

(72) Inventors: Christo Schutte, Wierda Park (ZA); Brenton Kinloch, Blairgowrie (ZA)

(73) Assignee: STRIKE TECH LTD., Pretoria (ZA)

( * ) Notice: Subject to any disclaimer, the term of this patent is extended or adjusted under 35 U.S.C. 154(b) by 189 days.

(21) Appl. No.: 18/554,953

(22) PCT Filed: Apr. 4, 2022

(86) PCT No.: PCT/IB2022/053097
§ 371 (c)(1),
(2) Date: Oct. 11, 2023

(87) PCT Pub. No.: WO2022/219450
PCT Pub. Date: Oct. 20, 2022

(65) Prior Publication Data
US 2024/0204515 A1 Jun. 20, 2024

(30) Foreign Application Priority Data

Apr. 13, 2021 (ZA) .................................. 2021/02395

(51) Int. Cl.
*H02H 1/06* (2006.01)
*H02H 9/04* (2006.01)

(52) U.S. Cl.
CPC ............. *H02H 9/042* (2013.01); *H02H 1/06* (2013.01)

(58) Field of Classification Search
CPC ............ H02H 9/04; H02H 1/06; H02H 9/042; H02H 1/0061; H02H 9/041; H02H 9/005;
(Continued)

(56) References Cited

U.S. PATENT DOCUMENTS 4,271,446 A 6/1981 Comstock
4,494,163 A 1/1985 Yelland
(Continued)

OTHER PUBLICATIONS

International Search Report issued in International Application No. PCT/IB2022/053097 (Jun. 30, 2022).

*Primary Examiner* — Danny Nguyen
(74) *Attorney, Agent, or Firm* — McBee, Moore & Vanik IP, LLC

(57) ABSTRACT

An electrical surge suppressor includes a capacitive component incorporated inside a housing and immersed in, or filled with, oil; a linear resistive component; and a non-linear resistive component connected or connectable in parallel with the linear resistive component. The surge suppressor has a monitoring circuit configured to measure at least one operating characteristic of the linear and/or non-linear resistive and capacitive components and an auxiliary power supply integrated within the capacitive component to provide an auxiliary supply voltage to the monitoring circuit. The capacitive component is connected in series with the parallel connected linear and non-linear resistive components and connected to a phase contact; the phase contact is connected or connectable to the load circuit; and the capacitive component is configured to provide a high impedance connection to the linear and non-linear resistive components, at nominal power supply frequencies and, during switching transients, to provide a low impedance to a combined resistive impedance of the linear and non-linear resistive components effectively into the load circuit.

21 Claims, 13 Drawing Sheets

(58) Field of Classification Search
CPC ........ G01R 31/64; G01R 27/26; G01R 15/06; G01R 31/12
USPC .................................................. 361/117–120
See application file for complete search history.

(56) References Cited

U.S. PATENT DOCUMENTS

| | | |
|---|---|---|
| 4,652,963 A | 3/1987 | Fahlen |
| 2012/0019965 A1 | 1/2012 | Nicholas et al. |
| 2014/0078622 A1 | 3/2014 | Allan |
| 2014/0368215 A1* | 12/2014 | Hoffman ............ G01R 19/0084 324/552 |
| 2021/0141031 A1* | 5/2021 | Viereck .................. G01R 31/64 |

* cited by examiner

ELECTRICAL SURGE SUPPRESSOR

CROSS-REFERENCE TO RELATED APPLICATIONS

This application is a National Stage entry of International Application No. PCT/IB2022/053097, filed Apr. 4, 2022, which claims priority to South African Patent No. 2021/02395, filed Apr. 13, 2021.

FIELD OF INVENTION

This invention relates to electrical power safety and equipment/asset protection and more specifically to a surge suppressor for low- to medium-voltage electrical equipment.

BACKGROUND OF INVENTION

The Inventor invented an electrical surge suppressor as disclosed in South African Patent No. 82/05995. This surge suppressor is effective at suppressing surges during switching in medium or high voltage switch controlled, cable connected, electric motor, transformer, or generator circuits.

A related, subsequent invention was disclosed in South African Patent No. 2011/04748, whereby the configuration of the capacitive and resistive (linear and non-linear) components was swapped, and modular components utilised. By providing a capacitive connection to the phase, this component serves as a coupling mechanism for partial discharge monitoring.

The Inventor now desires an improved surge suppressor providing even more modular components and updated monitoring capabilities.

SUMMARY OF INVENTION

The invention provides an electrical surge suppressor configured to be connected between earth and a phase of a switch controlled, AC electric load circuit, the surge suppressor including:
- a capacitive component incorporated inside a housing and immersed in, or filled with, oil;
- a linear resistive component having a linear V-I characteristic and being connected to the earth;
- a non-linear resistive component connected or connectable in parallel with the linear resistive component and having a pre-determined knee-point voltage value;
- a monitoring circuit configured to measure at least one operating characteristic of the linear and/or non-linear resistive and capacitive components; and
- an auxiliary power supply integrated within the capacitive component to provide an auxiliary supply voltage to the monitoring circuit, wherein:
- the capacitive component is connected in series with the parallel connected linear and non-linear resistive components and connected to a phase contact;
- the phase contact is connected or connectable to the load circuit;
- the capacitive component is configured to provide a high impedance connection to the linear and non-linear resistive components, at nominal power supply frequencies and, during switching transients, to provide a low impedance to a combined resistive impedance of the linear and non-linear resistive components effectively into the load circuit at frequencies associated with wavefront rise times of up to 5 µs (microseconds);
- the capacitive component is configured to increase the rise time of a portion of a steep-fronted surge which exceeds a knee-point voltage value of the non-linear resistive component; and
- an external contact is arranged between the linear resistive component and the capacitive component.

The capacitive component may be a main capacitive component and auxiliary power supply may be provided by a secondary capacitive component connected to the main capacitive component. The auxiliary supply voltage may eliminate the need for an external high voltage transformer.

The auxiliary power supply may be configured such that under steady state conditions, a capacitive reactance of the secondary capacitive component is increased thereby reducing power dissipation and providing the capability to handle higher total harmonic voltage distortion levels. The auxiliary power supply may be configured such that under transient conditions, an impedance of the secondary capacitive component is effectively limited when the non-linear resistive component reaches or exceeds the knee-point voltage, reducing the total capacitive reactance and thereby increasing the rise time of the portion of the steep-fronted surge. Thus, the RC time constant ($\tau=RC$) may be increased due to the increase in capacitance and increasing the rise time.

The external contact may be used for testing components of the surge suppressor. In the context of this specification, testing may include type testing, routine testing and/or maintenance testing. By applying a testing apparatus across the external contact and earth, the linear resistive component may be tested. In this fashion, the influence of the capacitive component may be excluded when testing the linear resistive component. The testing apparatus may be operable to apply a DC test voltage across the linear resistive component, thereby to load the resistive component to test its rated power and then optionally to assess thermal impact on the capacitive component.

Similarly, by applying the testing apparatus across the phase contact and the external contact, the capacitive component may be tested. In this fashion, the influence of the linear resistive component may be excluded when testing the capacitive component. The testing apparatus may be operable to apply and AC or DC test voltage across the capacitive component.

In addition, an external monitoring device such as a Partial Discharge (PD) monitor, may be connected to the surge suppressor, thereby assessing, and predicting imminent failures of motors, transformer, and/or generators.

The monitoring circuit may be configured to measure at least one operating characteristic in the form of current, voltage, and/or temperature. The monitoring circuit may include one or more sensors (e.g., temperature sensor, voltage sensor, current sensor, etc.). The monitoring circuit may be configured to provide a protection function in that if the at least one operating parameter violates an operating threshold, the monitoring circuit implements a protective action. The protective action may include disconnecting one or more components, providing a short or open circuit, triggering an alarm, etc.

The monitoring circuit may include a communications device. The communications device may be configured to communicate measured operating characteristics and status to a recipient. The recipient may be one or more of smartphone/tablet device, a human machine interface (HMI), and/or a cloud/web-based interface.

The monitoring circuit may include a display component, e.g., an LED or other light emitter or LCD/OLED. The display component may be configured to provide an indication (e.g., a visual indication) of one of the operating characteristics and/or of a violated operating threshold (e.g., a warning, alarm, or error/trip condition).

The auxiliary power supply may be a low voltage power supply below 1000 Vac. The monitoring circuit may be powered by the low voltage power supply.

The capacitive component may be provided by a capacitor pack comprising a plurality of capacitors. The capacitors may be in series, in parallel, or a combination of series and parallel. The capacitor pack may comprise an H-bridge configuration. The H-bridge configuration may provide points from which to provide the auxiliary power supply.

The bushing may be transparent/translucent or have a transparent/translucent window, to enable viewing an interior, e.g., to view a level or state of the oil.

The electrical surge suppressor may be modular, allowing for modular exchange of its components. An advantage of this modular configuration is that a standard or uniform base module may be manufactured. The electrical surge suppressor may include a variety of interchangeable modules, each with its non-linear resistive component being rated at different voltage levels, for example between 3.3 kV and 15 kV, thereby to adjust or modify the rating of the surge suppressor as a whole. Also, the non-linear resistive component may be tested independently of the other components by applying a testing apparatus across its contacts when the interchangeable module has been removed from the base module. This also allows for a specific non-linear resistive component to be selected so that its knee-point voltage characteristics and energy rating are suitable for a specific application.

The surge suppressor may be modular, and the housing may be embodied by a bushing, wherein the capacitive component, the linear resistive component, and the non-linear resistive component are mounted in or to the bushing. The capacitive component may be provided inside the bushing and the bushing may be filled with the oil, thereby to immerse the capacitor in the oil. The linear resistive component, the non-linear resistive, and the monitoring circuit may be mounted to an outside of the bushing, thus being separated from the oil inside the bushing.

The linear and/or non-linear resistive components may be modular and replaceable. For example, if the linear resistive component fails, it may be removed and replaced with a new one, without needing to discard the whole surge suppressor.

The invention extends to a surge suppressor assembly including at least one electrical surge suppressor as defined above accommodated in a base unit. The surge suppressor assembly may include three electrical surge suppressors accommodated in the base unit, for a three-phase power system.

The base unit may include a common earth connection. The surge suppressor(s) may be electrically connected to the base unit, thereby to be electrically connected to the common earth connection.

The invention extends to a surge suppressor kit for assembling into a surge suppressor assembly as defined above, in which a plurality of surge suppressors are provided with different ratings or characteristics, such that the surge suppressor assembly can be constituted using the base and one or more surge suppressors selected from plurality of surge suppressors provided with the different ratings or characteristics.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of an example embodiment of the invention is provided as an enabling teaching of the invention. Those skilled in the relevant art will recognise that changes can be made to the example embodiment described, while still attaining the beneficial results of the present invention. It will also be apparent that some of the desired benefits of the present invention can be attained by selecting some of the features of the example embodiment without utilising other features. Accordingly, those skilled in the art will recognise that modifications and adaptations to the example embodiment are possible and can even be desirable in certain circumstances and are a part of the present invention. Thus, the following description of the example embodiment is provided as illustrative of the principles of the present invention and not a limitation thereof.

Figure 1:
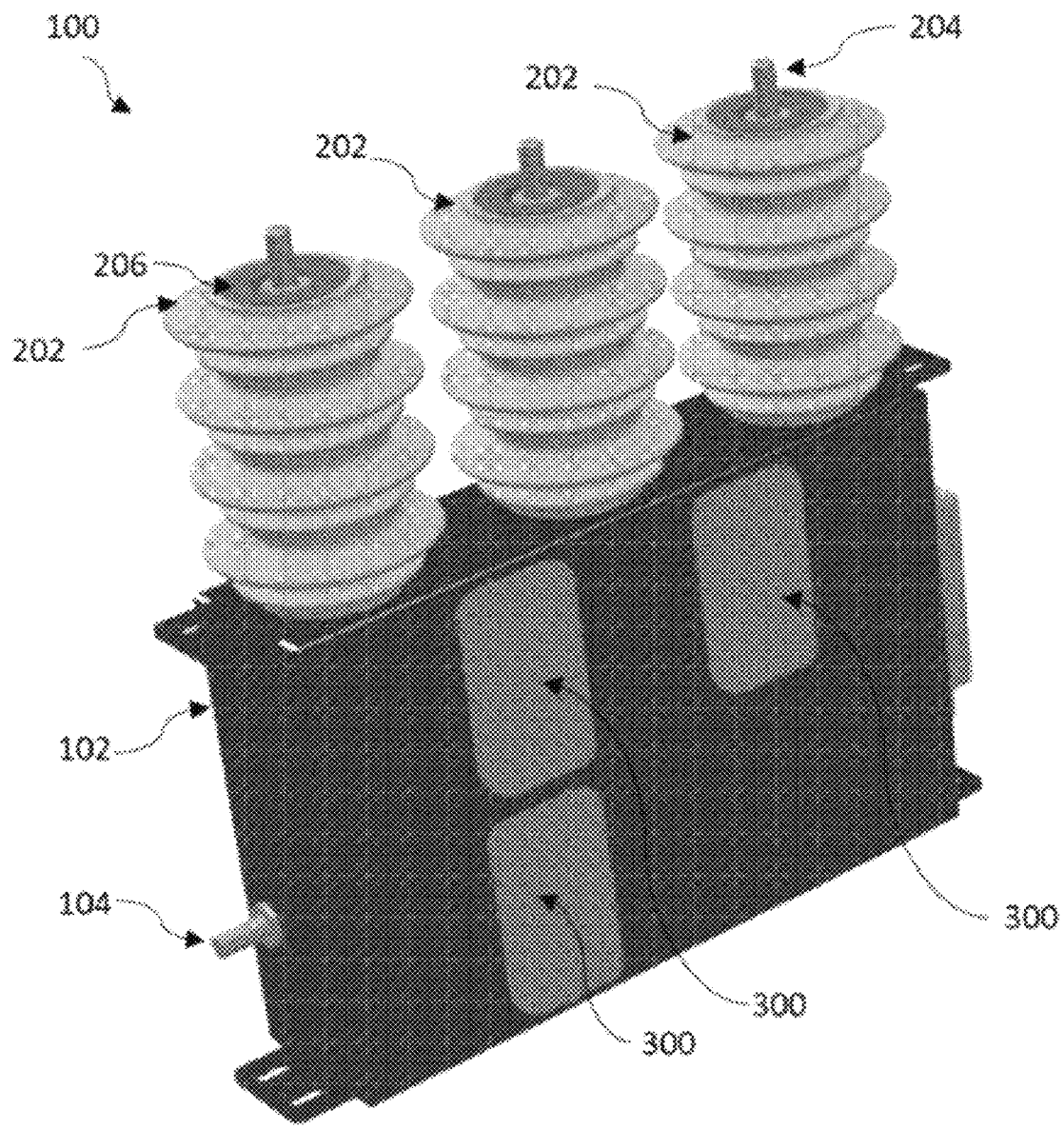
FIG. 1 shows a three-dimensional view of a surge suppressor assembly, in accordance with the invention.
Figure 2:
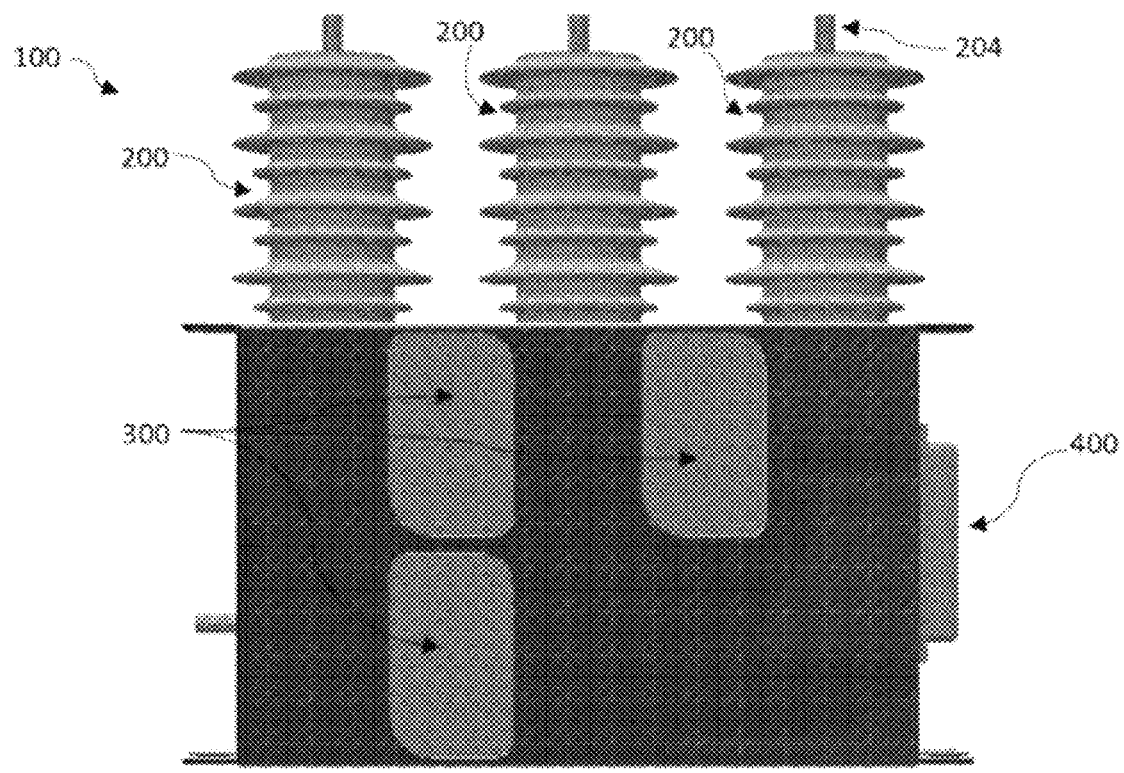
FIG. 2 shows a side view of the surge suppressor assembly of FIG. 1.

FIGS. 1-2 illustrate a surge suppressor 100, in accordance with the invention. The surge suppressor 100 is intended for three-phase operation (although other variants may be practicable) and accordingly it comprises three high-voltage bushing units 200 and component packs 300 mounted to a base unit 102.

The outward appearance of the assembly of the surge suppressor 100, that is, of the base unit 102, the bushing units 200, and component packs 300 may vary based on operational conditions or design criteria. The base unit 102 is rectangular and defines sockets to accommodate the bushing units 200 and component packs 300. The base unit 102 has a common earth terminal 104. Earth terminals (not illustrated) of each of the component packs 300 are also electrically connected to the common earth terminal 104 by means of reliable conductive mechanical fasteners, e.g., cables, lugs, bolts, terminals, spring force, etc.

Each bushings unit 200 comprises a high voltage bushing 202 having a shed-profile for required clearance and creepage distances. The bushing 202 is hollow and optionally translucent, providing at least limited visibility into its interior. A phase (or live) terminal 204, in the form of an upwardly projecting threaded stud 204, is provided at a top of the bushing 202 for connection to a phase line. An oil filler plug 206 is provided in an aperture at the top of the bushing 202 or individual capacitor element (not illustrated), to access an interior, e.g., to fill or access the oil therein. The oil filler plug 206 may be used to service, drain, or refill oil within the bushing 202. However, oil-filled bushings per se are known, so these details are not germane to the invention. The oil may be filled, used, configured, etc. using conventional techniques. The bushing 202 may be of a non-ceramic material, e.g., a polymer, fibre glass reinforced material with polymer shed profiles.

Figure 3:
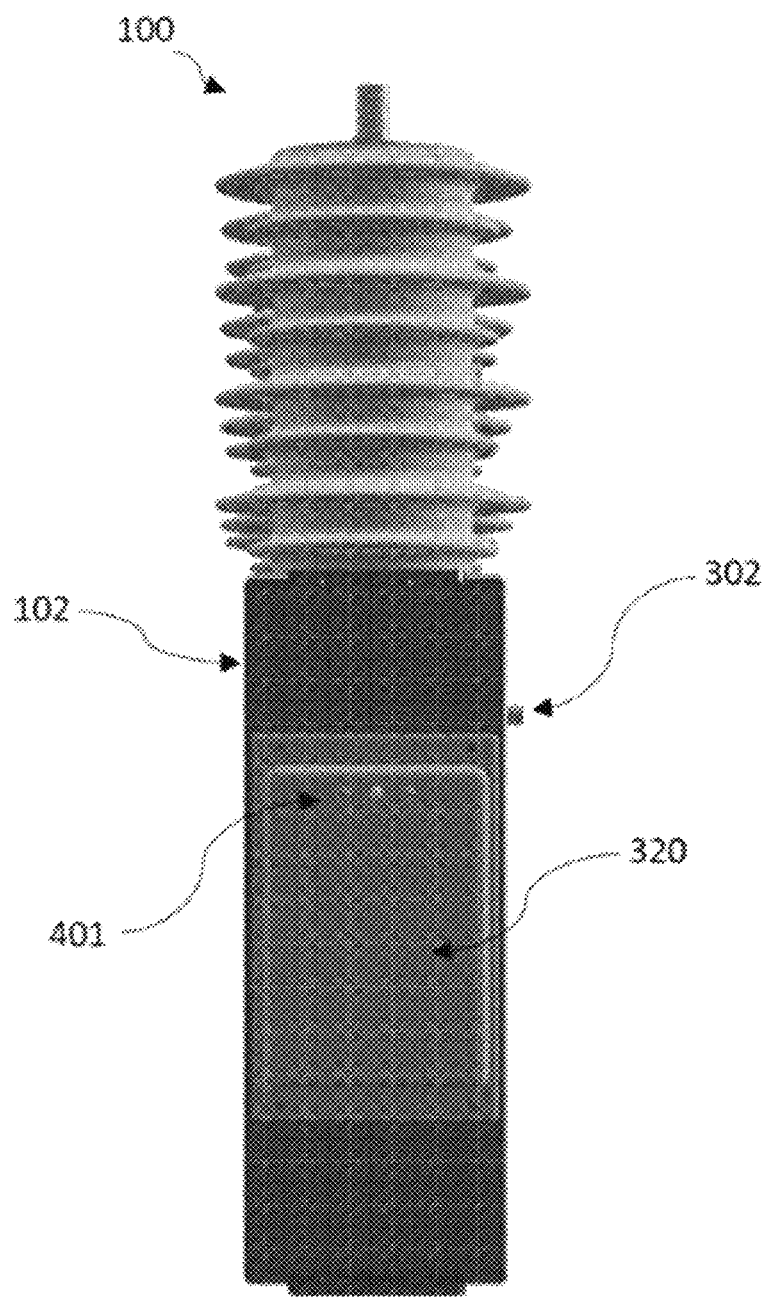
FIG. 3 shows a side view of the surge suppressor assembly of FIG. 1.

FIG. 3 illustrates the surge suppressor, 100 with a connection point 302 for an external monitoring device in the form of a partial discharge monitoring device provided at a side of the base unit 102. A monitoring circuit 320 may be located at a side of the base unit 102 with indication of the status of the surge suppressor 100 (including the communications interface).

Figure 4:
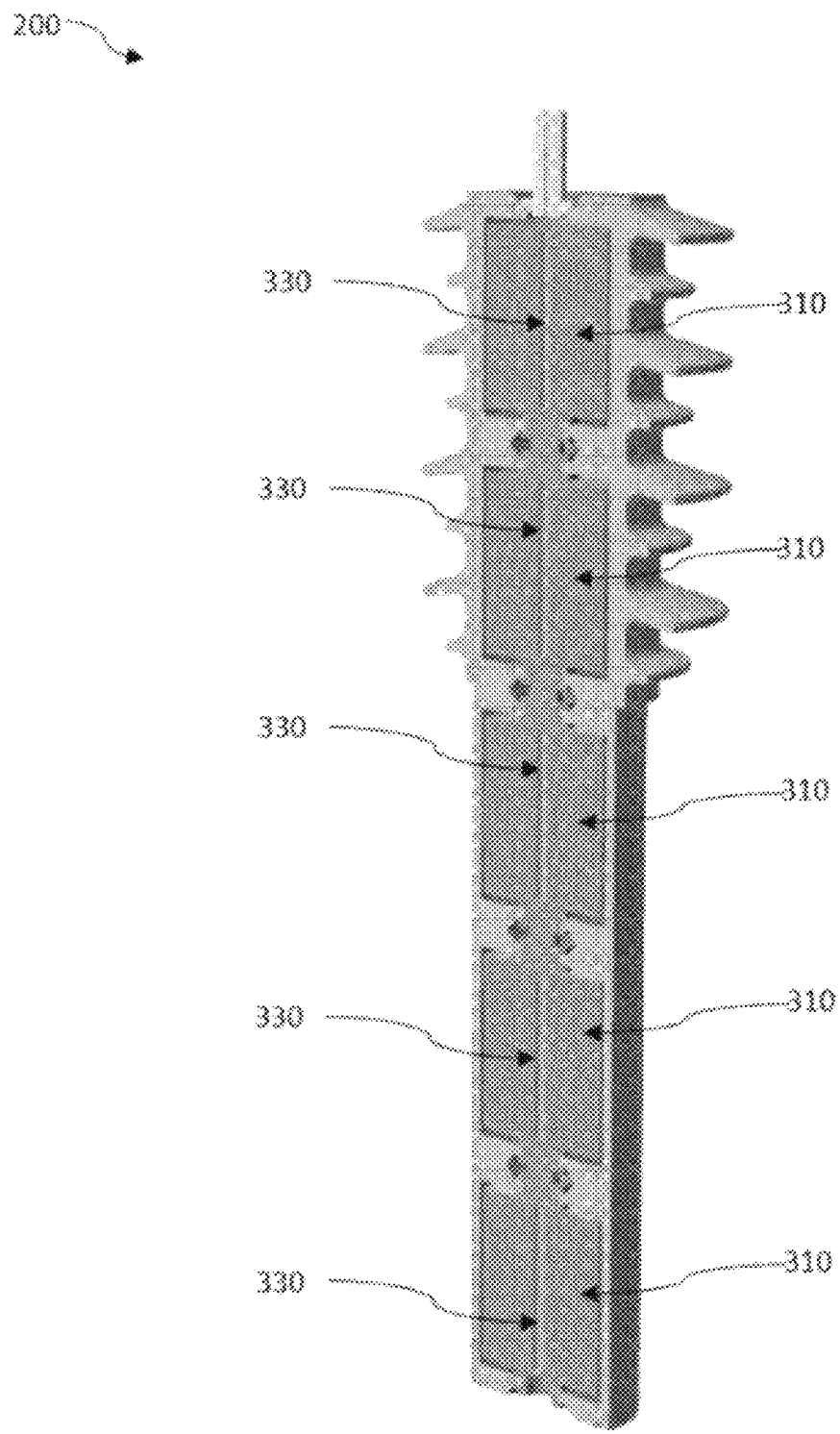
FIG. 4 shows modular surge capacitors of the assembly of the surge suppressor of FIG. 1.

FIG. 4 illustrates a cross-section of the bushing unit 200 with a capacitive component 310 provided inside the bushing 202 and is therefore immersed in, or filled with, oil. The capacitive component 310 could be one very large capacitor but, in this example, it is in the form of a capacitor pack 310 comprising a plurality of capacitors (see FIGS. 4-6 for further details). The capacitive components 310 may contain discharge resistors 330 in order to safely discharge the voltage stored in the capacitive element when ac voltage supply is switched off.

Figure 5:
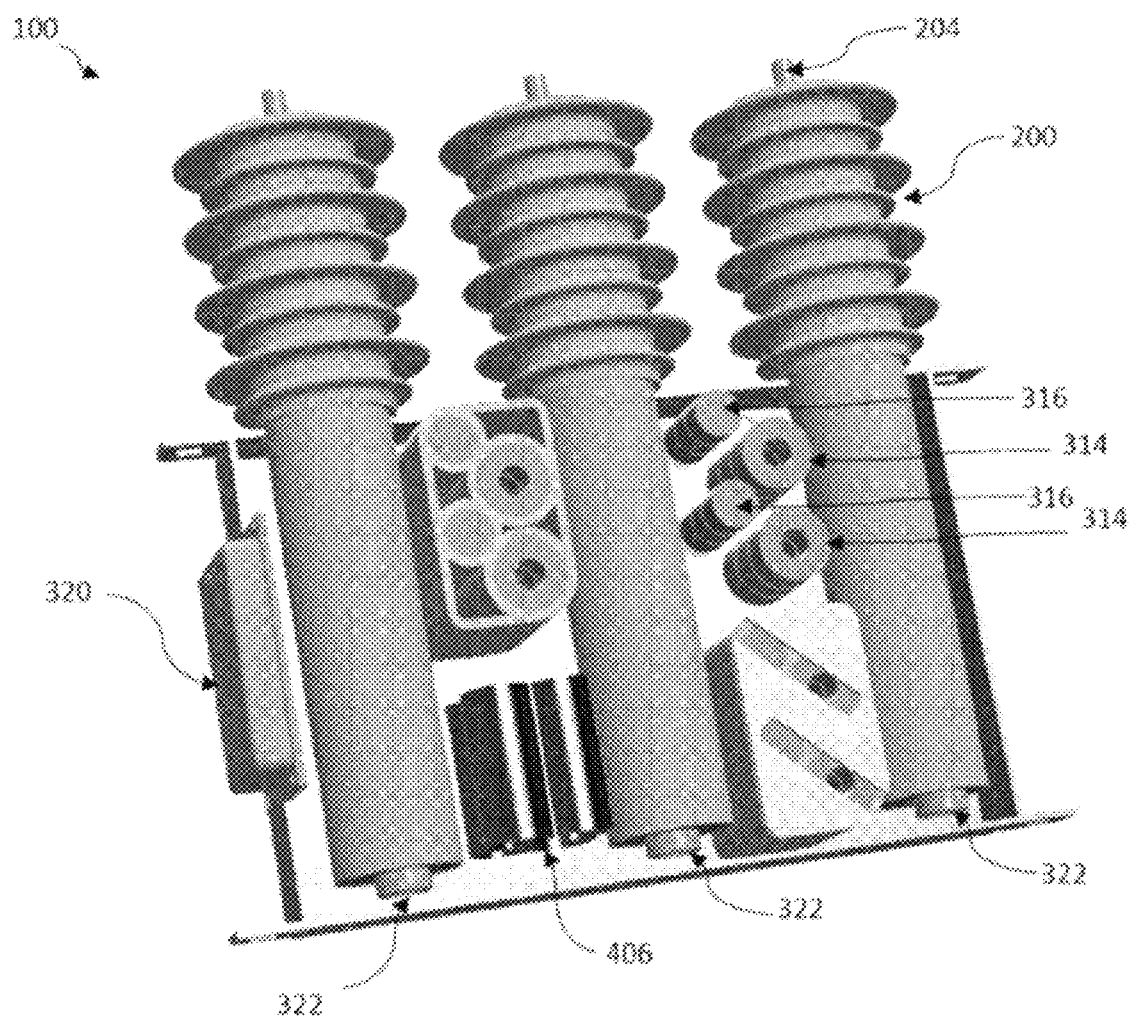
FIG. 5 shows a three-dimensional view of and electrical surge suppressor assembly of FIG. 1.

FIG. 5 illustrates the surge suppressor 100 with a linear resistive component, in the form of a high voltage resistor pack 314, having a linear V-I characteristic and being connected to the earth, separated from the oil in the bushing 200. Similarly, the surge suppressor 100 has a non-linear resistive component, in the form of a metal oxide varistor pack (or MOV pack for short) 316, connected or connectable in parallel with the resistor pack 314 and having a predetermined knee-point voltage value.

The resistor pack 314 and the MOV pack 316 are connected in parallel, while the capacitive component 310 is connected in series with the parallel connected resistor and MOV packs 314, 316. The bushing unit 200 containing the capacitive component 310 (FIG. 4) is connected to the phase contact 204 and is configured to provide a high impedance connection to the resistive and MOV packs 314, 316 at nominal power supply frequencies (50-60 Hz), and to couple a combined resistive impedance of the resistive and MOV packs 314, 316 effectively into the load circuit at frequencies associated with wavefront rise times of up to five microseconds. The capacitive component 310 (FIG. 4) in the bushing 200 is configured to increase the rise time of a portion of a steep-fronted surge which exceeds a knee-point voltage value of the MOV pack 316.

The monitoring circuit 320 is provided and is configured to measure at least one operating characteristic of the linear and/or non-linear resistive components 314, 316 or other components. The monitoring circuit 320 is configured to provide monitoring and/or protection of the individual components including system parameters (e.g., the resistive and MOV packs 314, 316, system voltage etc.) of the surge suppressor 100. The monitoring circuit 320 interfaces with a current transformer (CT) 322 and includes various other sensors (temperature, pressure, humidity etc.) configured to measure parameters providing optimum protection for the surge suppressor 100. A section of the H-bridge 406 is configured to provide auxiliary power (refer to FIG. 6).

A communication device is connected to, or integrated with, the monitoring circuit 320 and is configured to transmit the measured parameters to external recipients (e.g., cloud-based monitoring, predictive and maintenance algorithms).

Figure 6:
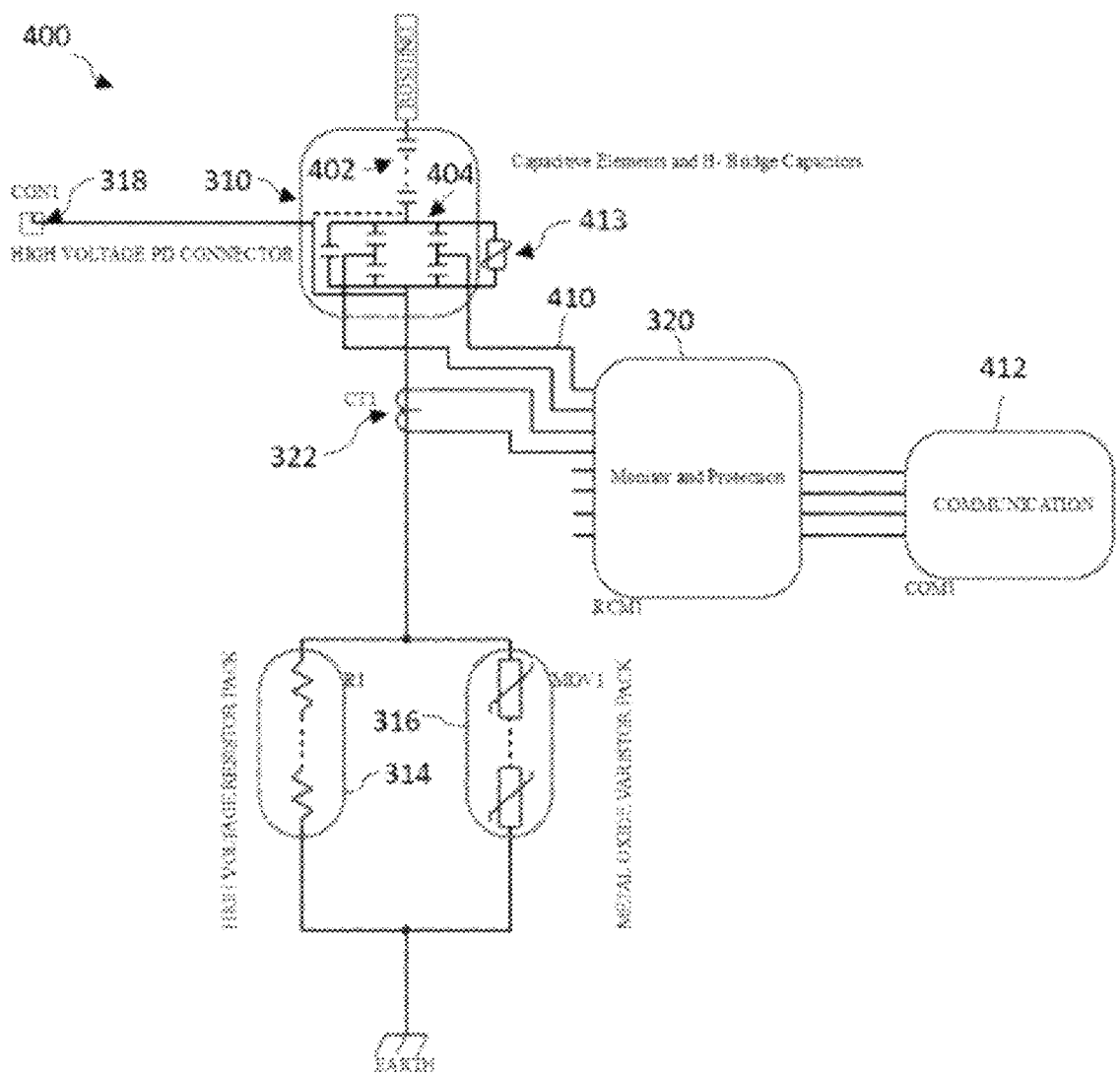
FIG. 6 shows a circuit diagram of the surge suppressor of FIG. 1.

Referring now to FIG. 6, a circuit diagram 400 of the surge suppressor 100 with a single bushing unit 202 is illustrated. The same reference numerals in the FIGS refer to the same or similar parts.

FIG. 6 illustrates a composition of the capacitive component 310 which comprises several capacitors. More specifically, the capacitive component 310 comprises multiple high-voltage capacitors 402 connected in series in order to be able to withstand high system voltages that the capacitive component 310 will be exposed to during normal operation. Variations in the number of capacitors 402 connected in series and the layers and thickness of film and foil used is dependent on a particular design based on the required safety factors and margins. As mentioned previously, the capacitive component 310 is submerged in oil in order to increase the capacitance (the oil serves as a dielectric) and provide additional insulation resistance, as well as assisting with heat transfer/dissipation.

Further, the capacitive component 310 comprises a capacitive H-bridge 404 which, in turn, comprises plural capacitors arranged in parallel. The H-bridge 404 is configured to an unbalanced voltage between centre points of the bridge to provide an auxiliary power point 410 to which auxiliary equipment (e.g., the monitoring circuit 320) can be connected and powered. This configuration may eliminate a requirement for high voltage step down transformers or the need for wide range power supplies to power auxiliary equipment. The high-voltage capacitors 402 and/or the H-bridge 404 can be contained in separate units, or a single oil filled container.

There may be various capacitive component 310 design options:
- The high-voltage capacitors 402 may all be in their own oil-filled container and then provided in series with the H-bridge 404 being in its own oil-filled container (for a total of two separate oil-filled containers);
- Each high-voltage capacitor 402 may be in its own oil-filled container which are then connected in series and, in turn, provided in series with the H-bridge 404 being in its own oil-filled container (for a total of three or more separate oil-filled containers); or
- All capacitors 402, 404 may be in a single oil-filled container (for a total of one oil-filled container).
- There may be secondary MOVs 413 connected in parallel with the H-Bridge 404 capacitive element in order to effectively remove the capacitor function of the H-Bridge 404 during fast rising transient conditions in order to increase the capacitance of the surge suppressor 100.

The resistive pack 314 may comprise a plurality of individual resistors connected in series/parallel configurations depending on the power rating required for the suppressor design. The MOV pack 316 may comprise multiple metal oxide varistors placed in series and rated depending on the required clamping voltage and power rating of the suppressor design. The CT (current transformer) 322 provides a signal to the monitoring circuit 320 to derive the required parameters to protect the components of the surge suppressor 100.

The external contact 318, which may be considered a high voltage partial discharge connector, provides a connection point for external monitoring equipment to be connected (typically partial discharge monitoring) as well as access to the individual components (e.g., the resistive and MOV packs 314, 316) in the surge suppressor 100. The external contact 318 provides direct access to the capacitors 402, 404 coupled to the supply lines of the equipment to be monitored.

The auxiliary power supply connection 410 is provided by "tapping" off from the capacitors in the H-bridge 404. The auxiliary connection 410 is used to power the monitoring circuit 320.

Figure 7:
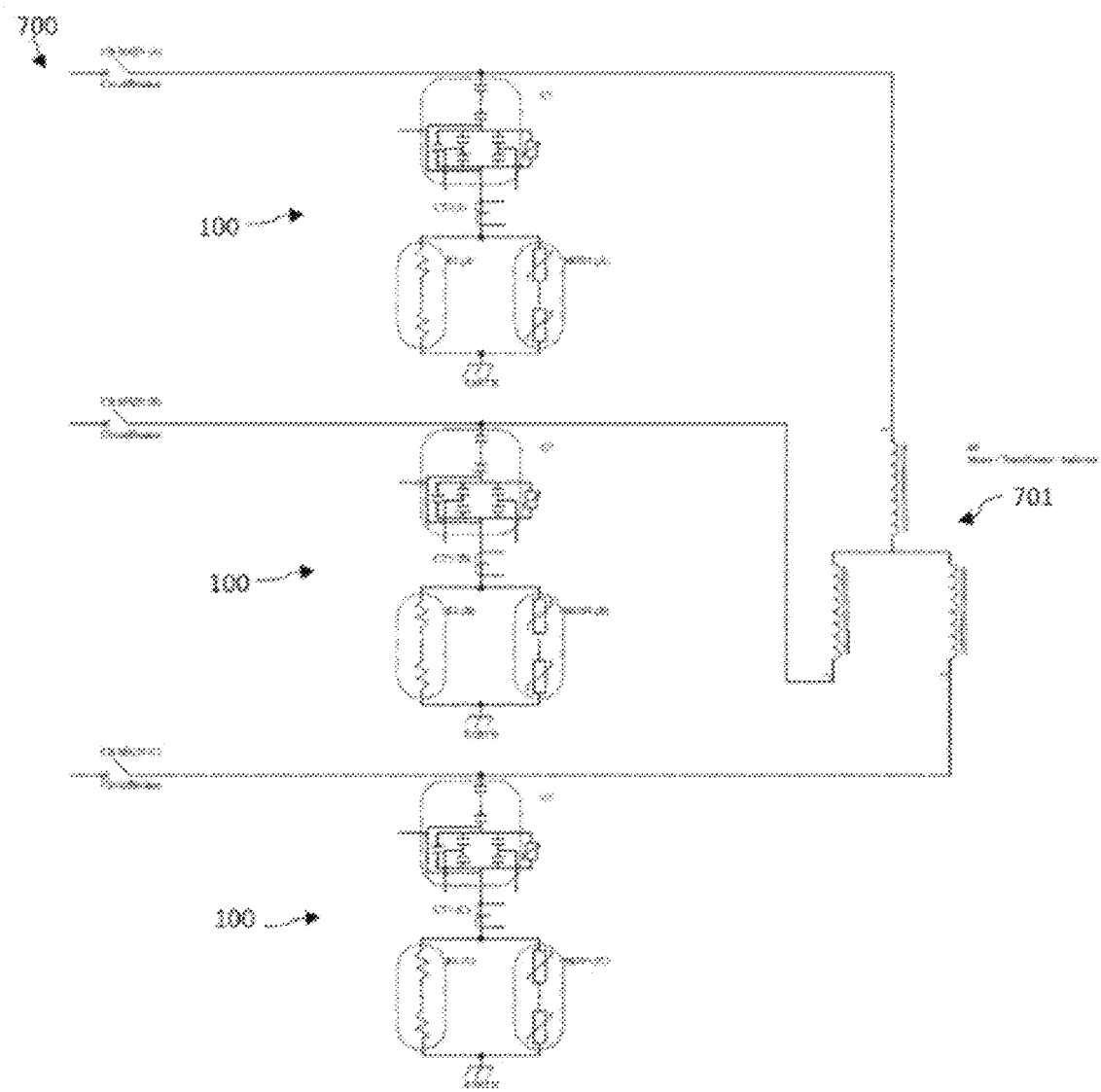
FIG. 7 shows a circuit diagram of the typical application of the surge suppressor assembly of FIG. 1.

FIG. 7 illustrates a circuit diagram 700 of the surge suppressor 100 with all three bushing units 200 for a three-phase application (e.g., a three-phase motor 701).

Figure 8:
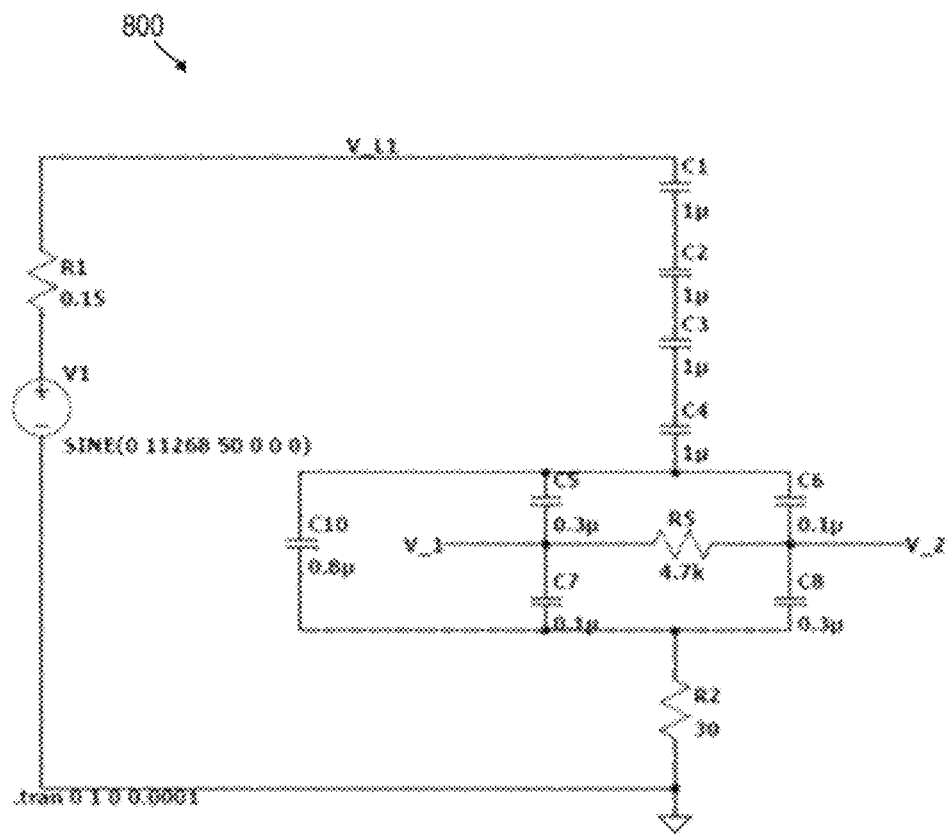
FIG. 8 shows a circuit diagram of an H-bridge configuration of the surge suppressor assembly of FIG. 1.
Figure 9:
FIG. 9 shows a graph of a simulated unbalanced power supply provided by the H-bridge of FIG. 8.

FIGS. 8-9 illustrate an H-bridge configuration 800 of the surge suppressor 100 configured to provide a power supply between points V_1 and V_2 having a waveform 900.

Figure 10:
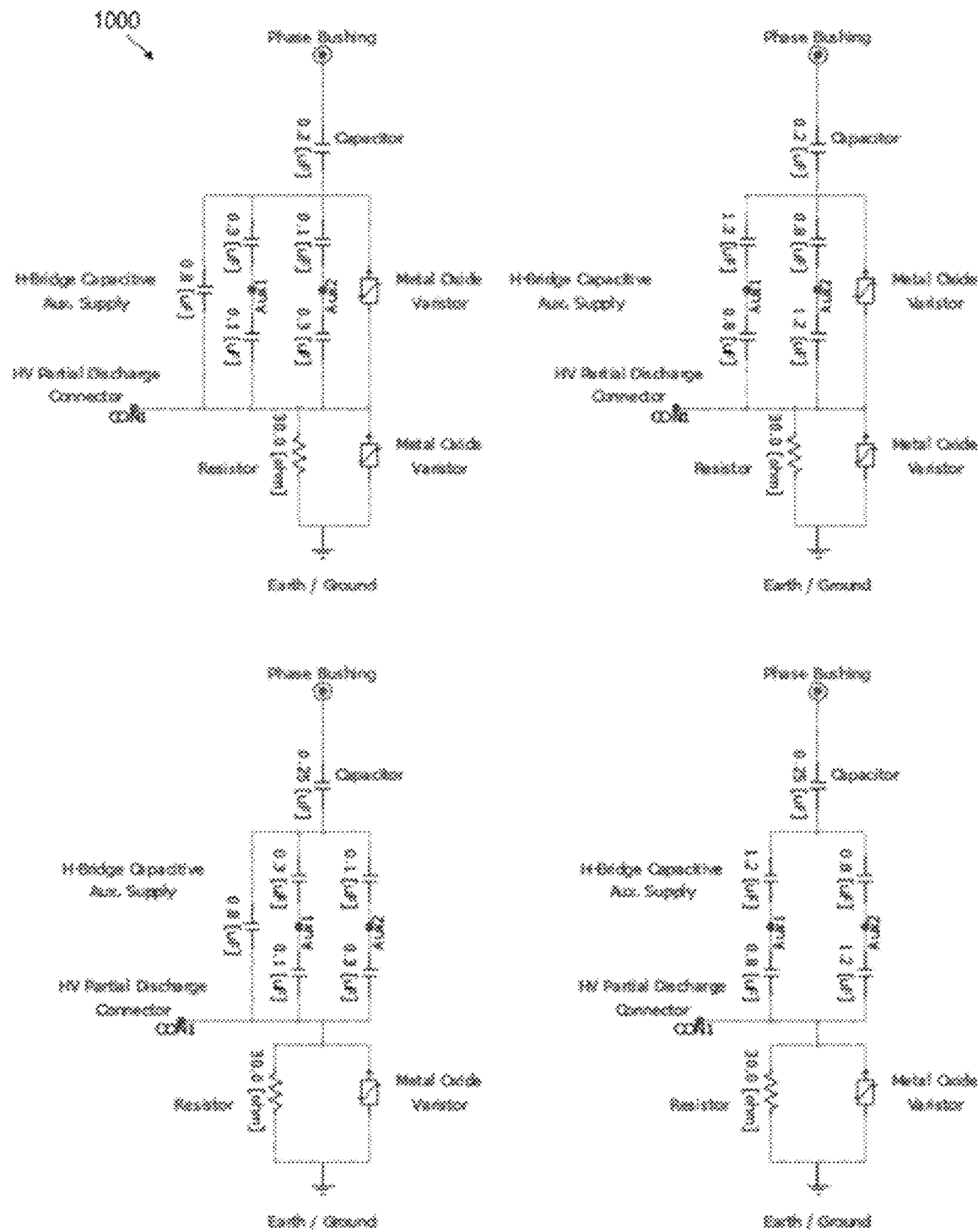
FIG. 10 shows circuit diagrams of alternative H-bridge configurations of the surge suppressor assembly of FIG. 1.

FIG. 10 illustrates an alternative H-bridge configuration 1000 with various configuration options.

Figure 11:
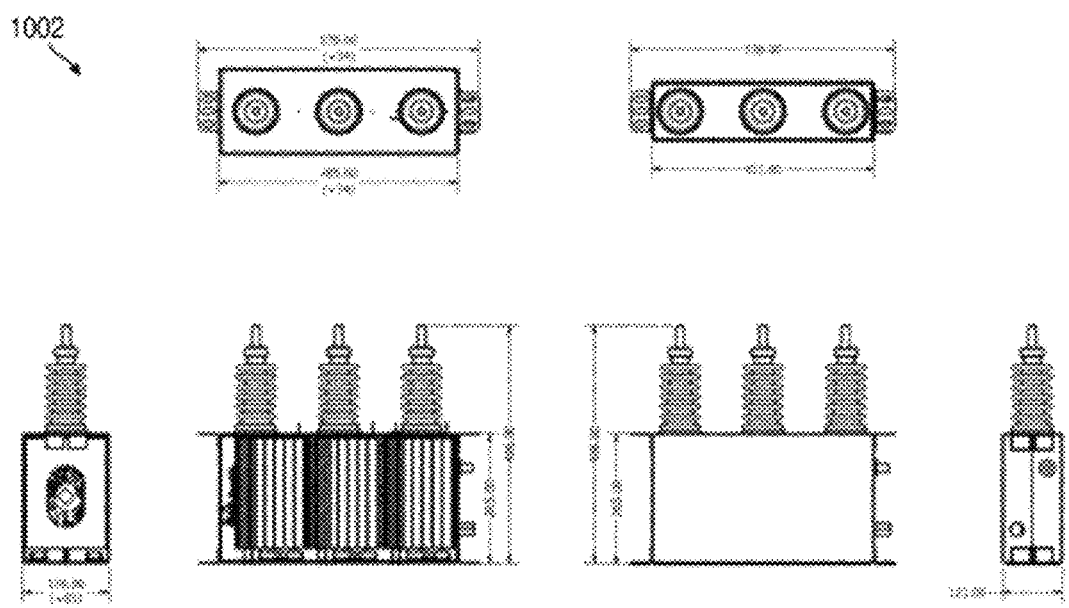
FIG. 11 shows various schematic views of an alternative surge suppressor of FIG. 1 in a metal enclosure and ceramic bushings.
Figure 12:
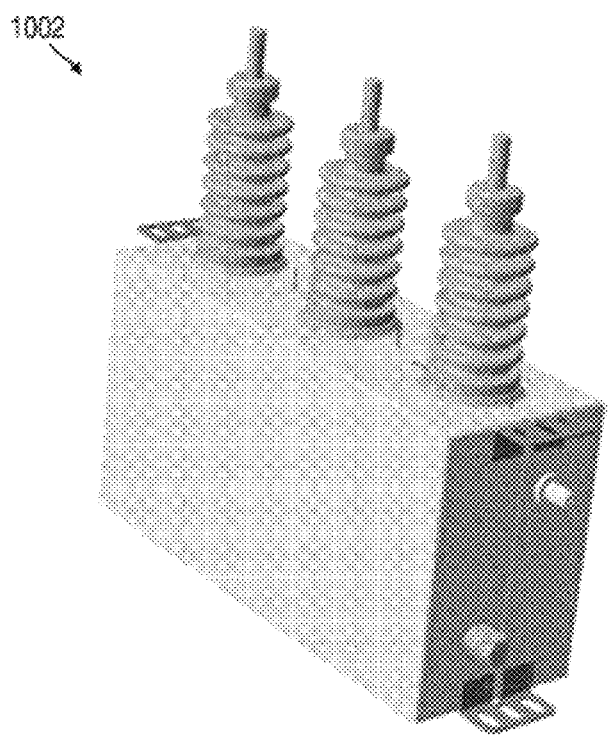
FIG. 12 shows a three-dimensional view of the surge suppressor of FIG. 11.

FIGS. 11-12 illustrate an alternative configuration 1002 of the surge suppressor 100, containing all the components in a current form factor utilising a metal enclosure and ceramic bushings, with communications capability provided via a fibre optic interface. The components may not be modular/replaceable.

Figure 13:
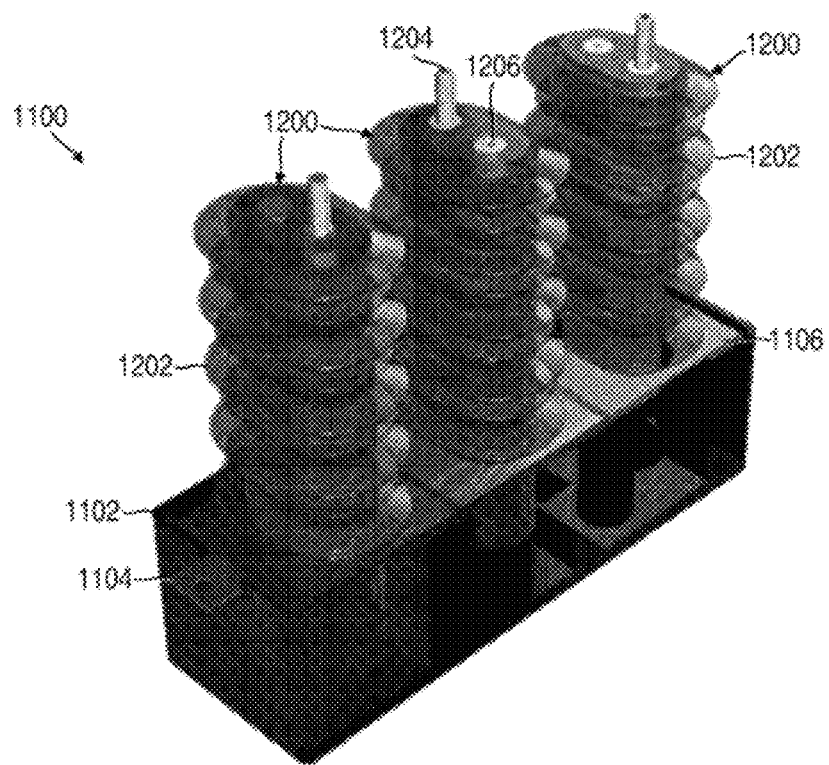
FIG. 13 shows a three-dimensional drawing of a surge suppressor assembly, in accordance with the invention.
Figure 14:
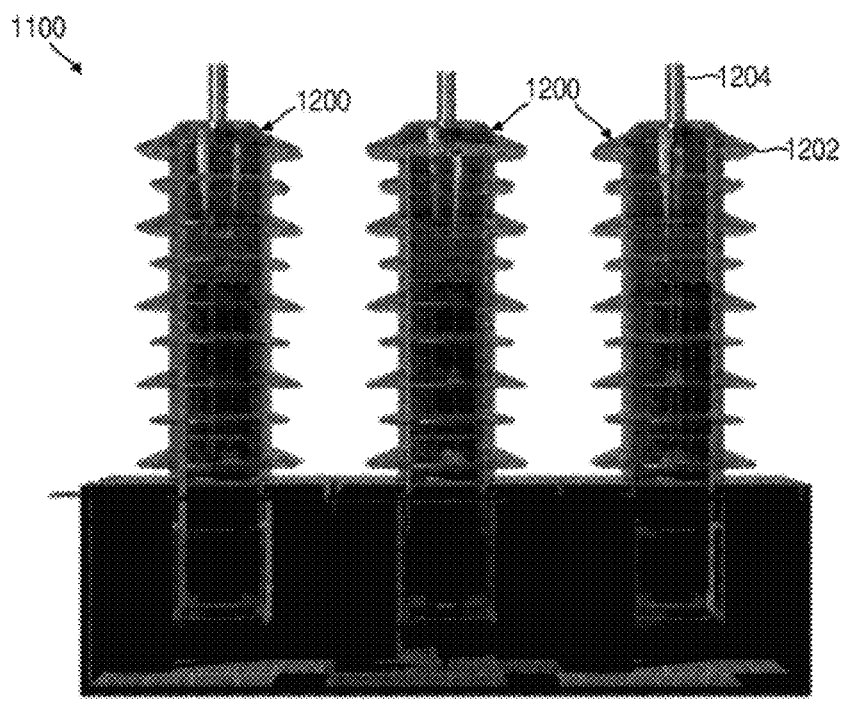
FIG. 14 shows a side view of the surge suppressor assembly of FIG. 13.
Figure 15:
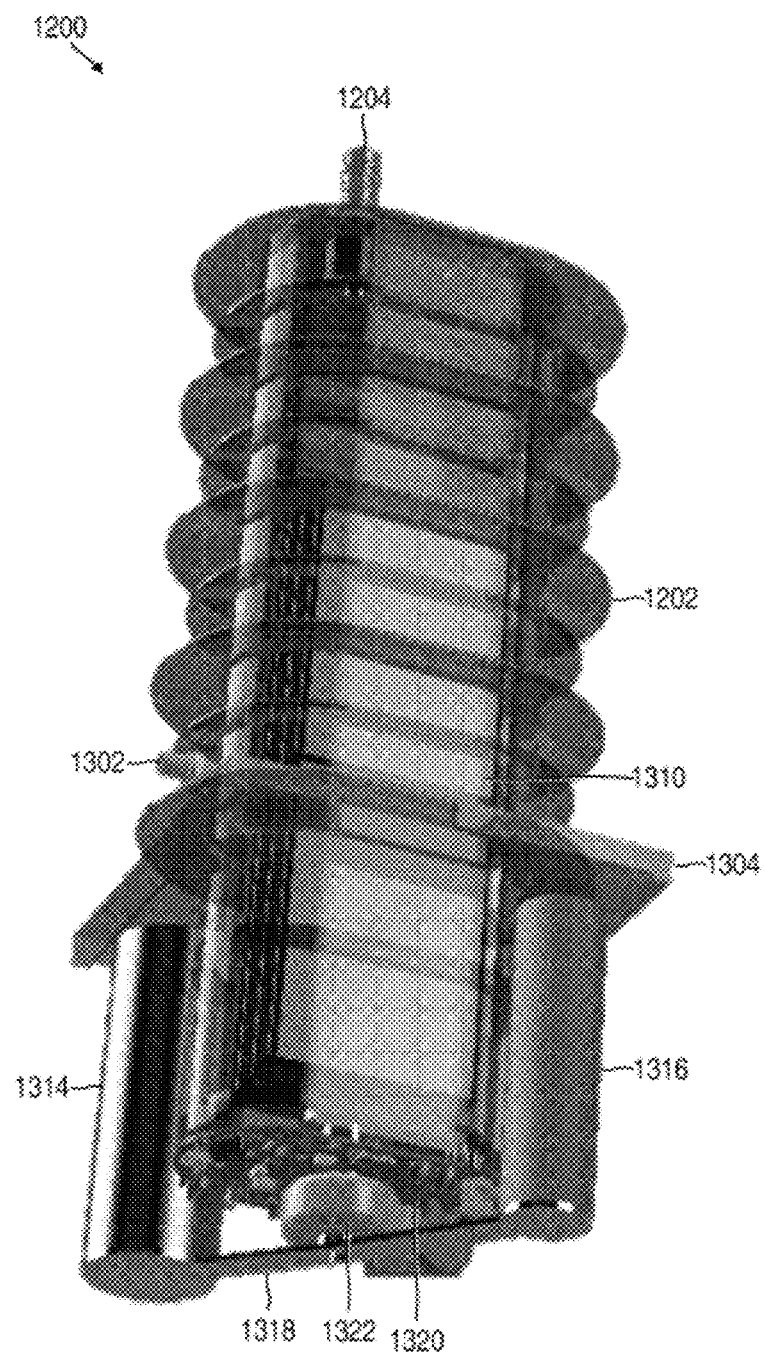
FIG. 15 shows a three-dimensional view of an electrical surge suppressor forming part of the surge suppressor assembly of FIG. 13.

FIGS. 13-15 illustrates a different embodiment in the form of a surge suppressor assembly 1100, in accordance with the invention. The assembly 1100 is intended for three-phase operation (although other variants may be practicable) and accordingly it comprises three electrical surge suppressors 1200 mounted in a base unit 1102. Several features of the assembly 1100 may be similar or identical to those of the surge suppressor 100.

The outward appearance of the assembly 1100, that is, of the base unit 1102 and the surge suppressors 1200 may vary based on operational conditions or design criteria. The base unit 1102 is rectangular and defines three sockets to accommodate the three surge suppressors 1200. The base unit 1102 has a common earth terminal 1104 connected to a common earth plate 1106. Earth terminals (not illustrated) of each of the surge suppressors 1200 are also electrically connected to the common earth plate 1106 by means of reliable conductive mechanical fasteners, e.g., cables, lugs, bolts, terminals, spring force, etc.

Each surge suppressor 1200 comprises a high voltage bushing 1202 having a shed-profile for required clearance and creepage distances. The bushing 1202 is hollow and potentially translucent, providing at least limited visibility into its interior. A phase (or live) terminal 1204, in the form of an upwardly projecting threaded lug 1204, is provided at a top of the bushing 1202 for connection to a phase line. An oil filler plug 1206 is provided in an aperture at the top of the bushing 1202, to access an interior, e.g., to fill or access the oil therein. The oil filler plug 1206 may be used to service, drain, or refill oil within the bushing1 202. However, oil-filled bushings per se are known, so these details are not germane to the invention. The oil may be filled, used, configured, etc. using conventional techniques. The bushing 1202 may be of a non-ceramic material, e.g., a polymer, fibre glass reinforced material with polymer shed profiles.

FIG. 15 illustrates the surge suppressor 1200 in more detail. A connection point for a partial discharge monitoring device 1302 is provided at a side of the bushing 1202. The surge suppressor 1200 has a square collar 1304 towards a mid-bottom region of the bushing 1202 to locate the bushing 1202 snugly in the base unit 1102.

A capacitive component 1310 is provided inside the bushings 1202 and is therefore immersed in, or filled with, oil. The capacitive component 1310 could be one large capacitor but, in this example, it is in the form of a capacitor pack 1310 comprising a plurality of capacitors.

The surge suppressor 1200 has a linear resistive component, in the form of a high voltage resistor pack 1314, having a linear V-I characteristic and being connected to the earth, separated from the oil in the bushing 1202. Similarly, the surge suppressor 1200 has a non-linear resistive component, in the form of a metal oxide varistor pack (or MOV pack for short) 1316, connected or connectable in parallel with the resistor pack 1314 and having a pre-determined knee-point voltage value. The MOV pack 1316 is also separated from the oil of the capacitive component 1310 inside the bushing 1202.

The resistor pack 1314 and the MOV pack 1316 are connected in parallel, while the capacitive component 1310 is connected in series with the parallel connected resistor and MOV packs 1314, 1316. An external contact 1318 is arranged between the resistive and MOV packs 1314, 1316 and the capacitive component 1310. The capacitive component 1310 is connected to the phase contact 1204 and is configured to provide a high impedance connection to the resistive and MOV packs 3114 and 1316 at nominal power supply frequencies (50-60 Hz), and to couple a combined resistive impedance of the resistive and MOV packs 1314, 1316 effectively into the load circuit at frequencies associated with wavefront rise times of up to five microseconds. The capacitive component 1310 is configured to increase the rise time of a portion of a steep-fronted surge which exceeds a knee-point voltage value of the MOV pack 1316.

A monitoring circuit 1320 is provided and is configured to measure at least one operating characteristic of the linear and/or non-linear resistive components 1314, 1316 or other components. The monitoring circuit 1320 is configured to provide monitoring and/or protection of the individual components including system parameters (e.g., the resistive and MOV packs 1314, 1316, system voltage etc.) of the surge suppressor 1200. The monitoring circuit 1320 interfaces with a current transformer (CT) 322 and various other sensors (temperature, pressure, humidity etc.) deriving measured parameters providing optimum protection for the surge suppressor 1200.

A communication device is connected to, or integrated with, the monitoring circuit 1320 and is configured to transmit the measured parameters to external recipients (e.g., cloud-based monitoring, predictive and maintenance algorithms).

The surge suppressor assembly 1100 may include some or all of the features described in FIGS. 6-10.

The Applicant believes that the invention as exemplified provides several advantages or overcomes various drawbacks of prior art systems, as follows:

Provides an auxiliary power supply that can be used to power monitoring and protection equipment as part of the capacitor design in an RC snubber/surge suppressor/power factor correction capacitors circuit. Deliberately creating an unbalance and tapping the auxiliary supply voltage from the unbalance.

Unbalanced capacitive power supply design protects the equipment connected by virtue of the capacitor impedance reduced in the event of switching transient surges.

Provides easier access to test individual components and a modular replacement of the individual parts.

Eliminates exposing the heat generating components (resistive components) from the oil, thus preventing catastrophic failure and rupturing of the tank.

Monitors the state of health of the various components in the RC snubber/surge suppressor/power factor correction capacitors (continuous or interval monitoring).

Provides access to external partial discharge monitoring equipment utilising the internal capacitor as the PD (Partial Discharge) coupling device.

Visual indication of the state of health of the RC snubber/surge suppressor/power factor correction capacitors (local or via remote communication and indication).

RC Surge suppressor that is able to operate with continuous high Voltage harmonic distortion levels, if fitted with MOV 413

Modular components (Capacitors, Resistive Elements, Monitoring and Protection Device, Communications Modules).

Provides and auxiliary power supply eliminating the need for high a voltage transformer by virtue of the capacitor pack configuration.

Monitor state of health of the individual components and the surge suppressor as a system component.

Components can be tested separately and replaced as and when required.

Capacitor assembly utilising the internal space of the bushing reducing overall size and weight.

The invention claimed is:

1. An electrical surge suppressor configured to be connected between earth and a phase of a switch controlled, AC electric load circuit, the surge suppressor including:
    a capacitive component incorporated inside a housing and immersed in, or filled with, oil;
    a linear resistive component having a linear V-I characteristic and being connected to the earth;
    a non-linear resistive component connected or connectable in parallel with the linear resistive component and having a pre-determined knee-point voltage value;
    a monitoring circuit configured to measure at least one operating characteristic of the linear and/or non-linear resistive and capacitive components; and
    an auxiliary power supply integrated within the capacitive component to provide an auxiliary supply voltage to the monitoring circuit,
    wherein:
    the capacitive component is connected in series with the parallel connected linear and non-linear resistive components and connected to a phase contact;
    the phase contact is connected or connectable to the load circuit;
    the capacitive component is configured to provide a high impedance connection to the linear and non-linear resistive components, at nominal power supply frequencies and, during switching transients, to provide a low impedance to a combined resistive impedance of the linear and non-linear resistive components effectively into the load circuit at frequencies associated with wavefront rise times of up to 5 µs;
    the capacitive component is configured to increase the rise time of a portion of a steep-fronted surge which exceeds a knee-point voltage value of the non-linear resistive component; and
    an external contact is arranged between the linear resistive component and the capacitive component.

2. The surge suppressor as claimed in claim 1, in which the capacitive component is a main capacitive component and auxiliary power supply is provided by a secondary capacitive component connected to the main capacitive component.

3. The surge suppressor as claimed in claim 2, whereby the auxiliary power supply is configured such that (1) under steady state conditions, a capacitive reactance of the secondary capacitive component is increased thereby reducing power dissipation and providing the capability to handle higher total harmonic voltage distortion levels, but (2) under transient conditions, an impedance of the secondary capacitive component is effectively limited when the non-linear resistive component reaches or exceeds the knee-point voltage, reducing the total capacitive reactance and thereby increasing the rise time of the portion of the steep-fronted surge.

4. The surge suppressor as claimed in claim 1, in which the external contact is configured to be used for testing components of the surge suppressor, wherein:
    by applying a testing apparatus across the external contact and earth, the linear resistive component can be tested; or
    by applying a testing apparatus across the phase contact and the external contact, the capacitive component can be tested.

5. The surge suppressor as claimed in claim 1, which includes an external monitoring device configured to predict and assess imminent failures of motors, transformers, and/or generators.

6. The surge suppressor as claimed in claim 1, in which the monitoring circuit includes a sensor configured to measure at least one operating characteristic in the form of current, voltage, and/or temperature.

7. The surge suppressor as claimed in claim 6, in which the monitoring circuit is configured to provide a protection function in that if the at least one operating characteristic violates an operating threshold, the monitoring circuit implements a protective action, wherein the protective action includes one or more of disconnecting one or more components, providing a short or open circuit, or triggering an alert.

8. The surge suppressor as claimed in claim 6, in which the monitoring circuit includes a communications device which is configured to communicate at least the measured operating characteristic to a recipient.

9. The surge suppressor as claimed in claim 6, in which the monitoring circuit includes a display component which is configured to provide an indication of one of the operating characteristics and/or of a violated operating threshold.

10. The surge suppressor as claimed in claim 1, in which the auxiliary power supply is a low voltage power supply below 1000 Vac and in which the monitoring circuit is powered by the low voltage power supply.

11. The surge suppressor as claimed in claim 1, in which the capacitive component is provided by a capacitor pack comprising a plurality of capacitors.

12. The surge suppressor as claimed in claim 11, in which the plurality of capacitors are in an H-bridge configuration.

13. The surge suppressor as claimed in claim 12, in which the H-bridge configuration provides points from which to provide the auxiliary power supply.

14. The surge suppressor as claimed in claim 1, which is modular and in which the housing is embodied by a bushing, wherein the capacitive component, the linear resistive component, and the non-linear resistive component are mounted in or to the bushing.

15. The surge suppressor as claimed in claim 14, in which:
the capacitive component is provided inside the bushing and in which the bushing is filled with the oil, thereby to immerse the capacitor in the oil; and the linear resistive component, the non-linear resistive, and the monitoring circuit are mounted to an outside of the bushing, thus being separated from the oil inside the bushing.

16. The surge suppressor as claimed in claim 15, in which the bushing is transparent or translucent or has a transparent or translucent window, to enable viewing an interior to view a level or state of the oil.

17. The surge suppressor as claimed in claim 14, in which the linear and/or non-linear resistive components are modular, being replaceable or interchangeable without needing to replace a remainder of the surge suppressor.

18. A surge suppressor assembly including at least one electrical surge suppressor as claimed in claim 14 accommodated in a base unit.

19. The surge suppressor assembly as claimed in claim 18, in which a plurality of the surge suppressors accommodated in the base unit, for a multi-phase power system.

20. The surge suppressor assembly as claimed in claim 19, which defines a common earth connection and in which the plurality of surge suppressors are electrically connected to the base unit, thereby to be electrically connected to the common earth connection.

21. A surge suppressor kit for assembling into a surge suppressor assembly as claimed in claim 18, in which a plurality of surge suppressors are provided with different ratings or characteristics, such that the surge suppressor assembly can be constituted using the base and one or more surge suppressors selected from plurality of surge suppressors provided with the different ratings or characteristics.

* * * * *